(12) United States Patent
Haakana et al.

(10) Patent No.: US 9,359,657 B2
(45) Date of Patent: Jun. 7, 2016

(54) METHOD FOR LEACHING A SULPHIDIC METAL CONCENTRATE

(71) Applicant: Outotec Oyj, Espoo (FI)

(72) Inventors: Timo Haakana, Espoo (FI); Björn Saxén, Pori (FI)

(73) Assignee: Outotec Oyj, Espoo (FI)

( * ) Notice: Subject to any disclaimer, the term of this patent is extended or adjusted under 35 U.S.C. 154(b) by 105 days.

(21) Appl. No.: 14/357,150

(22) PCT Filed: Nov. 7, 2012

(86) PCT No.: PCT/FI2012/051087
§ 371 (c)(1),
(2) Date: May 8, 2014

(87) PCT Pub. No.: WO2013/068645
PCT Pub. Date: May 16, 2013

(65) Prior Publication Data
US 2014/0311296 A1    Oct. 23, 2014

(30) Foreign Application Priority Data
Nov. 8, 2011   (FI) ..................................... 20116104

(51) Int. Cl.
| | |
|---|---|
| *C22B 3/06* | (2006.01) |
| *C22B 3/08* | (2006.01) |
| *C22B 19/00* | (2006.01) |
| *C22B 3/00* | (2006.01) |
| *C22B 3/12* | (2006.01) |

(52) U.S. Cl.
CPC . *C22B 19/22* (2013.01); *C22B 3/06* (2013.01); *C22B 3/08* (2013.01); *C22B 3/12* (2013.01); *Y02P 10/234* (2015.11)

(58) Field of Classification Search
CPC .............. C22B 3/06; C22B 3/08; C22B 19/22
See application file for complete search history.

(56) References Cited

U.S. PATENT DOCUMENTS

| | | | |
|---|---|---|---|
| 3,923,617 A | 12/1975 | Morris et al. | |
| 4,125,588 A | 11/1978 | Hansen et al. | |
| 5,651,947 A | 7/1997 | Collins et al. | |

FOREIGN PATENT DOCUMENTS

| | | | |
|---|---|---|---|
| CA | 2425355 A1 * | 5/2002 | ............. C01G 53/04 |
| CN | 1676634 A | 10/2005 | |

(Continued)

OTHER PUBLICATIONS

Zuo Xiaohong, Zinc Sulfide Concentrates Oxygen Pressure Leaching Two Counter-current Principle and Comprehensive Recovery of Gallium Germanium Technology, (journal article), Hunan Nonferrous Metals, Feb. 1, 2009, pp. 26-28, vol. 25, No. 1.

(Continued)

*Primary Examiner* — George Wyszomierski
*Assistant Examiner* — Tima M McGuthry Banks
(74) *Attorney, Agent, or Firm* — Chernoff, Vilhauer, McClung & Stenzel, LLP

(57) ABSTRACT

A method for leaching a sulfidic metal concentrate in hydrometallurgical production of metal in a leaching process from which hot water vapor containing off-gas is conducted out and to which an acid solution warmed up to an elevated temperature is conducted. The acid solution is warmed up to an elevated temperature by bringing off-gas of the leaching step into direct contact with the acid solution.

11 Claims, 1 Drawing Sheet

(56) References Cited

FOREIGN PATENT DOCUMENTS

Figure 1:
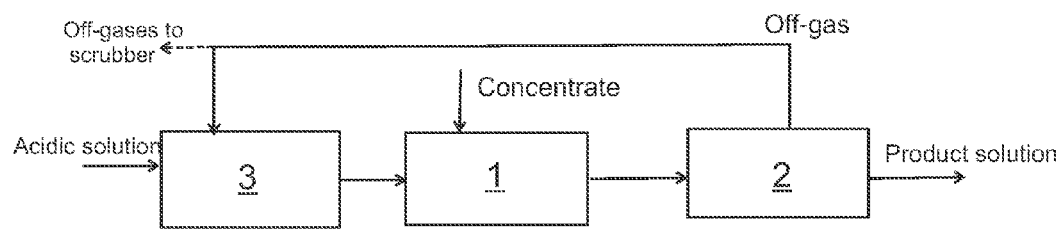

| | | |
|---|---|---|
| CN | 101205077 A | 6/2008 |
| CN | 101768665 A | 7/2010 |
| EP | 0272060 A2 | 6/1988 |
| FI | 100806 B | 8/1996 |
| FI | 121180 B | 11/2008 |
| FI | 121713 B | 6/2009 |
| WO | 9720954 A1 | 6/1997 |
| WO | 2004076698 A1 | 9/2004 |
| WO | 2007071021 A1 | 6/2007 |
| WO | WO 2010061045 A1 * | 6/2010 |

OTHER PUBLICATIONS

Japanese Patent Office, Notification of Reason for Refusal issued in application No. 2014-539374, Jan. 19, 2015.

State Intellectual Property Office of the People's Republic of China, Notification of First Office Action, issued in application 201280054544.5, Dec. 16, 2014, 6 pages, Beijing, China.

State Intellectual Property Office of the People's Republic of China, Notification of the Second Office Action issued in application No. 201280054544.5, Aug. 6, 2015, 10 pages) Beijing, China.

Zuo Xiaohong, "Two Counter-current Pressure Oxidation Leaching Principle of Zinc Sulfide Concentrates and Comprehensive Recovery of Gallium Germanium Technology", Hunan Nonferrous Metals, Feb. 28, 2009, pp. 26-28, vol. 25, No. 1, Beijing, China.

European Patent Office, Extended Search Report issued in application No. 12848501.8, Sep. 14, 2015, Munich, Germany.

Bionomic Industries Inc., N. N.: "Waste Heat Recovery Systems", 1 Jan. 1, 2008, Mahwah, NJ. XP002743246. Retrieved from the Internet (URL:http://www.bionomicind.comjpagesjWaste); Heat Recovery Systems.html [retrieved on Aug. 11, 2015] * "Typical Application and Uses: Heat up of process liquids"; figure; "How it Works"*.

Government of India, Ministry of Power, Bureau of Energy Efficiency, "Waste Heat Recovery", Jan. 15, 2004, pp. 1-18, New Delhi, India. XP002743247. Retrieved from the Internet: URL:http://www.em-ea.orgjguide%20booksjbook-2/2.8%20waste%20heat%20recovery.pdf [retrieved on Aug. 11, 2015], * p. 16: Thermo-compressor: *.

International Search Report, PCT/FI/2012/051087, Outotec Oyj, dated Feb. 25, 2013, 3 pgs.

Haakana T. et al., "Outotec Direct Leaching Application in China," The Southern African Institute of Mining and Metallurgy—Lead and Zinc 2008, pp. 69-84.

* cited by examiner

METHOD FOR LEACHING A SULPHIDIC METAL CONCENTRATE

CROSS-REFERENCE TO RELATED APPLICATIONS

This is a national stage application filed under 35 USC 371 based on International Application No. PCT/FI2012/051087, filed Nov. 7, 2012, and claims priority under 35 USC 119 to Finnish Patent Application No. FI-20116104, filed Nov. 8, 2011.

FIELD OF THE INVENTION

The invention relates to a method for leaching a sulfidic metal concentrate in the hydrometallurgical production of metal.

BACKGROUND OF THE INVENTION

Known from the prior art are methods for leaching a sulfidic metal concentrate in a leaching process in hydrometallurgical production of metal. Hot water vapor containing off-gas is conducted out from the leaching process. On the other hand, an acid solution warmed up to an elevated temperature is conducted to the process. Such methods are known for example from patent publications FI100806B, WO 2004/076698A1 and articles "Outotec Direct Leaching application in China", Haakana T., Saxén B., Lehtinen L., Takala H., Lahtinen M., Svens K., Ruonala M, Xiao ming; Lead & Zinc 2008, International Symposium on Lead and Zinc Processing, Durbaan, South Africa, 25-29 Feb. 2008, and "Zinc Plant Expansion by Outotec Direct Leaching Process", M. Lahtinen, K. Svens, T. Haakana, L. Lehtinen, Zinc and Lead Metallurgy, L. Centomo, M. J. Collins, J. Harlamovs, and J. Liu, Eds., Canadian Institute of Mining, Metallurgy and Petroleum (COM2008), Winnipeg, Canada 2008, 167-178, describing the direct leaching of zinc. Further known from publication FI 121713 B is a copper leaching method. A nickel leaching method is known from publication FI 121180 B relating to the leaching of nickel laterite ores.

In the leaching of a sulfidic metal concentrate, the sulfide leaching process produces exothermic reactions, generating a considerable amount of heat. This heat is removed from the leaching step in a hot water vapor containing off-gas. The off-gases carry out considerable amounts of energy in the form of water vapor of approximately 100° C. Normally, the off-gases are conducted to the atmosphere through a gas scrubber. On the other hand, an acid solution to be fed to the leaching process is warmed up with vapor produced by oil, natural gas or other such external heating energy source, producing great equipment investment costs, energy costs for the external heating energy and carbon dioxide emissions.

OBJECTIVE OF THE INVENTION

The objective of the invention is to remedy the defects referred to above.

A particular objective of the invention is to disclose a method enabling the utilization of thermal energy contained by hot water vapor contained by off-gases of the process produced by exothermic reactions occurring in the leaching of a sulfidic metal concentrate to warm up an acid solution to be conducted to the process.

A further objective of the invention is to disclose a method enabling a significant reduction in the external energy needed to warm up the acid solution to be conducted to the process and in the energy costs and increase in the energy efficiency and reduction in the carbon dioxide emissions of the process.

SUMMARY OF THE INVENTION

According to the invention, an acid solution is warmed up to an elevated temperature by bringing off-gas of a leaching step into direct contact with the acid solution.

The heat of the hot water vapor contained by the off-gas is recovered by bringing the off-gas into direct contact with the acid solution. Thus, there is no use or need for the conventional heat exchangers operated by indirect heat transfer, which could give rise to the problematic growth of sulfur compounds contained by the off-gas on cold surfaces. The advantage of the invention is that the sulfur-containing compounds do not cause any problems. When the off-gas is brought into direct contact with the acid solution, the hot water vapor contained by the off-gas condenses onto the surface of the cooler acid solution according to the liquid-gas equilibrium. The degree of condensation depends for example on the equilibrium states of the phases and on the surface area of the interface between the phases. As the water condensates, the acid solution dilutes a little bit, but to a very small degree and does not affect the process. A further advantage of the invention is that the thermal energy contained by the hot water vapor contained by the off-gases can be recovered so as to be able significantly to reduce the external energy needed to warm up the acid solution to be conducted to the process and thereby to be able to reduce the energy costs, so that the energy efficiency of the process is increased and the carbon dioxide emissions reduced. The invention is applicable for use in connection with the leaching of any sulfidic metal concentrate.

In one embodiment of the method, the acid solution is warmed up by providing it as droplets in the hot off-gas, the off-gas being present as a continuous phase. By injecting the acid solution as droplets in the off-gas, it is possible to have a large heat transfer area and efficient heat transfer.

In one embodiment of the method, the acid solution is sprayed through a nozzle forming droplets into the off-gas in a device where the off-gas and the acid solution move against the flow.

In one embodiment of the method, the off-gas and the acid solution are brought into mutual contact by an ejector/venturi technique.

In one embodiment of the method, the acid solution is warmed up by dispersing the off-gas into the acid solution, the acid solution being present as a continuous phase.

In one embodiment of the method, the off-gas is dispersed into a sulfuric acid solution.

In one embodiment of the method, the temperature of the water vapor in the off-gas of the leaching step is approximately 100° C.

In one embodiment of the method, the acid solution is warmed up to approximately 50 to 80° C. by means of the off-gas.

In one embodiment of the method, the metal to be leached is zinc and the acid is a sulfuric acid solution.

In one embodiment of the method, the acid solution to be warmed up is a return acid obtained from electrolysis.

In one embodiment of the method, the method comprises leaching in at least one low acid leaching step wherefrom hot water vapor containing off-gas is conducted out, and thereafter in at least one high acid leaching step whereto an acid solution warmed up to an elevated temperature is conducted. Before being conducted to the high acid leaching step, the acid solution is warmed up to an elevated temperature by bringing off-gas of the low acid leaching step into direct contact with the acid solution to be conducted to the high acid leaching step.

LIST OF FIGURES

Figure 2:
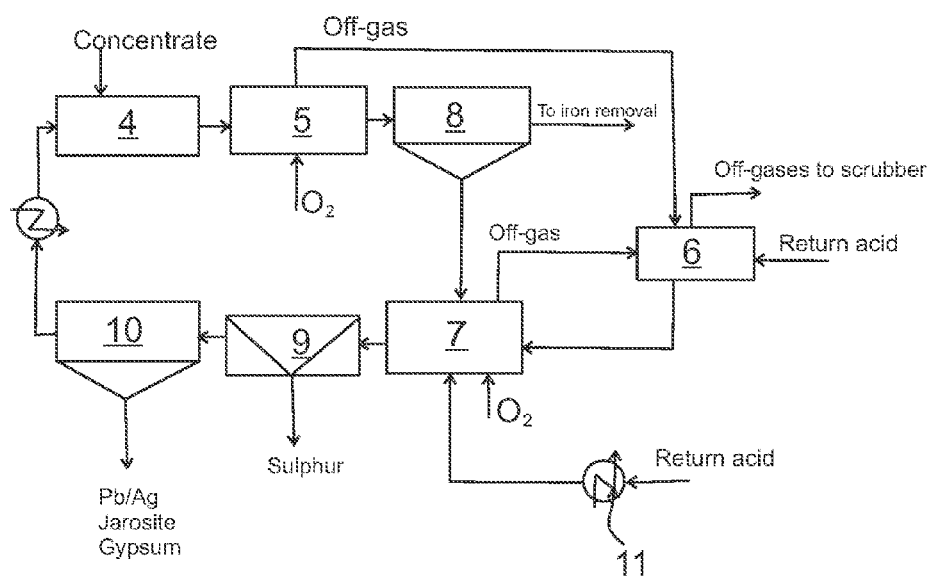

In the following section, the invention will be described in detail by means of exemplifying embodiments with reference to the accompanying drawing in which FIG. 1 illustrates a block diagram of a process or part of a process utilizing a first embodiment of the method according to the invention, and FIG. 2 illustrates a block diagram of a second embodiment of the method according to the invention.

DETAILED DESCRIPTION OF THE INVENTION

FIG. 1 illustrates a method for leaching a sulfidic metal concentrate in a hydrometallurgical leaching process.

In the metal concentrate leaching process, the sulfidic metal concentrate is leached under acidic and oxidative conditions in atmospheric pressure close to the boiling point of the solution (~100° C.). The dissolution of metal sulfides under acidic and oxidative conditions is an exothermic reaction system and produces considerable amounts of energy. In simplified terms, the reactions can be described as follows: A trivalent iron (ferric iron) oxidizes metal sulfides:

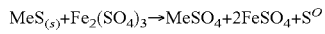

$$MeS_{(s)} + Fe_2(SO_4)_3 \rightarrow MeSO_4 + 2FeSO_4 + S^O$$

wherein Me=Zn, Fe, Cu, Co, Ni, Cd, Pb etc.

The divalent iron (ferrous iron) produced in the oxidation of metal sulfides is oxidized to become trivalent by means of oxygen gas and sulfuric acid:

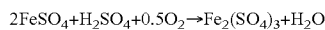

$$2FeSO_4 + H_2SO_4 + 0.5O_2 \rightarrow Fe_2(SO_4)_3 + H_2O$$

The above reactions can also be written out as an overall reaction:

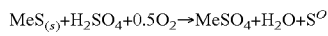

$$MeS_{(s)} + H_2SO_4 + 0.5O_2 \rightarrow MeSO_4 + H_2O + S^O$$

The leaching process includes a slurry-forming step 1, to which a metal concentrate in a powder or slurry form and an acid solution warmed up to an elevated temperature are fed and in which slurry-forming step 1 the metal concentrate is dispersed in the acid solution to form a suspension. From the slurry-forming step 1, the suspension of the concentrate and the acid solution is further conducted to a leaching step 2. In the leaching step 2, exothermic reactions take place. The heat generated in the reactions evaporates water which escapes from the leaching step 2 as a hot water vapor with the off-gases. This off-gas/water vapor is conducted to a heat recovery step 3 to warm up the acid solution before conducting it to the slurry-forming step 1. A part of the off-gases of the leaching step 2 is led to heat recovery 3 and another part directly to a scrubber past the recovery 3. This distribution of the gas flow could be controlled on the basis of temperature measurement in the leaching step 2. In the heat recovery step 3, the acid solution is warmed up to an elevated temperature by bringing off-gas of the leaching step into direct contact with the acid solution.

Bringing the off-gas into direct contact with the acid solution may be effected in many different ways. A large heat transfer area of the acid solution and the off-gas can be obtained by injecting the liquid as droplets in the gas or by distributing the gas in the liquid. The continuous phase can be either gas or liquid, depending on the case.

For example, the acid solution can be provided as droplets in the hot off-gas, the off-gas being present as a continuous phase. Acid solution can for example be sprayed in the off-gas through a nozzle forming droplets in a device where the off-gas and the acid solution move against the flow. It is further possible to bring the off-gas and the acid solution into mutual contact by an ejector/venturi technique. It is further possible to warm up the acid solution by dispersing the off-gas in the acid solution, the acid solution being present as a continuous phase.

FIG. 2 illustrates one example of a sulfidic metal concentrate leaching process, here a zinc concentrate direct leaching process developed by the applicant (Outotec® Zinc Direct Leaching Process), effected on a counterflow principle. The method according to the invention is adapted to said process.

The method of FIG. 2 comprises a slurry-forming step 4, whereto a sulfidic zinc concentrate in a powder or slurry form and an acid solution warmed up to an elevated temperature are fed. In the slurry-forming step 4, the zinc concentrate is dispersed in the acid solution to form a suspension. From the slurry-forming step 4, the suspension of the acid solution and the zinc concentrate is conducted to a low acid leaching step 5, to which oxygen is conducted. In the low acid leaching step 5, where most of the dissolution takes place, a large amount of heat is also produced by virtue of said exothermic reactions. The heat generated in the reactions evaporates water, which escapes from the low acid leaching step 5 with the off-gases as a hot water vapor having a temperature of approximately 100° C.

Instead of letting this off-gas go to waste, it is conducted according to the invention to a heat recovery step 6 to warm up a return acid obtained from an electrolysis process before conducting the return acid to a high acid leaching step 7. The electrolysis takes place at a temperature of below 40° C., so the temperature of the return acid obtained therefrom is approximately 35° C. From the low acid leaching step 5, the suspension is conducted to a first thickening step 8 where the low acid leaching step continues and wherefrom the thickened slurry is conducted to the high acid leaching step 7. Off-gases produced in the high acid leaching step 7 are also conducted to the heat recovery step 6. In the heat recovery step 6, the return acid solution is warmed up to an elevated temperature by bringing off-gas of the leaching step into direct contact with the return acid solution. From the heat recovery step 6, the off-gases are removed to the atmosphere through a gas scrubber. In the heat recovery step 6, the return acid can be warmed up as needed by means of the off-gas to approximately 50 to 80° C., preferably to 65° C. in the example process of FIG. 2.

In the heat recovery step 6, the acid solution can for example be provided as droplets in the hot off-gas, the off-gas being present as a continuous phase. Acid solution can for example be sprayed through a nozzle forming droplets in the off-gas in a device where the off-gas and the acid solution move against the flow. Further, it is possible to bring the off-gas and the acid solution into mutual contact by an ejector/venturi technique. Further, it is possible to warm up the acid solution by dispersing the off-gas in the acid solution, the acid solution being present as a continuous phase.

From the high acid leaching step 7, the acid solution is conducted to a flotation step 9 where floated sulfur is removed. From the flotation step 9, the acid solution and the non-floated fraction are further conducted to a second thickening step 10 where lead, silver, jarosite and gypsum are separated from the acid solution. The acid solution escaping from the thickening step 10 is warmed up with vapor before being conducted back to the slurry-forming step 4.

In addition to using off-gases of the low and high acid leaching steps 5 and 7 to warm up the return acid in the heat recovery step 6, the return acid to be conducted to the high acid leaching step 7 is warmed up further in a heat exchange step 11, where the return acid is warmed up by an external energy source. In using off-gas of the low and high acid leaching steps to warm up the return acid, the heat exchange step 11 needs significantly less vapor produced by an external energy source than before.

The invention is not limited merely to the exemplifying embodiments referred to above; instead, many variations are possible within the scope of the inventive idea defined by the claims.

The invention claimed is:

1. A method for leaching a sulfidic metal concentrate in hydrometallurgical production of metal using a leaching process, from which process water vapor containing off-gas is conducted out and to which process an acid solution warmed to an elevated temperature is conducted, characterized in that the acid solution is warmed by bringing off-gas of the leaching process into direct contact with the acid solution.

2. The method according to claim 1, characterized in that the acid solution is warmed by providing it as droplets in the off-gas, the off-gas being present as a continuous phase.

3. The method according to claim 2, characterized in that the acid solution is sprayed in the off-gas through a nozzle forming droplets in a device where the off-gas and the acid solution move against a flow.

4. The method according to claim 2, characterized in that the off-gas and the acid solution are brought into mutual contact by an ejector/venturi technique.

5. The method according to claim 1, characterized in that the acid solution is warmed by dispersing the off-gas in the acid solution, the acid solution being present as a continuous phase.

6. The method according to claim 5, characterized in that the off-gas is dispersed in a sulfuric acid solution.

7. The method according to claim 1, characterized in that the temperature of the water vapor in the off-gas of the leaching process is approximately 100° C.

8. The method according to claim 1, characterized in that the acid solution is warmed up to between approximately 50° C. to approximately 80° C. by means of the off-gas.

9. The method according to claim 1, characterized in that the metal is zinc and the acid is sulfuric acid.

10. The method according to claim 1, characterized in that the acid solution is a return acid obtained from electrolysis.

11. The method according to claim 1, characterized in that the method comprises at least one first acid leaching step from which water vapor containing off-gas is conducted out, and thereafter at least one second acid leaching step, where before being conducted to the second acid leaching step, the acid solution is warmed by bringing off-gas of the first acid leaching step into direct contact with the acid solution to be conducted to the second acid leaching step.

* * * * *